(12) United States Patent
Grosskopf et al.

(10) Patent No.: US 8,987,956 B2
(45) Date of Patent: Mar. 24, 2015

(54) HIGH SPEED CLUTCH DESIGN WITH JAW TOOTH PROFILE TO REDUCE SEPARATING LOAD

(75) Inventors: Andrew P. Grosskopf, Rockford, IL (US); Glenn C. Lemmers, Jr., Loves Park, IL (US); Joseph Kenneth Coldwate, Roscoe, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1178 days.

(21) Appl. No.: 12/436,168

(22) Filed: May 6, 2009

(65) Prior Publication Data
US 2010/0283342 A1 Nov. 11, 2010

(51) Int. Cl.
*H02K 7/108* (2006.01)
*F16D 11/14* (2006.01)
*F16D 11/00* (2006.01)

(52) U.S. Cl.
CPC .............. *H02K 7/108* (2013.01); *F16D 11/14* (2013.01); *F16D 2011/004* (2013.01); *F16D 2011/008* (2013.01)
USPC ........................... 310/78; 192/69.82; 192/108

(58) Field of Classification Search
CPC ....................................................... F16D 11/14
USPC ................ 310/78, 92, 94–102 A; 192/62.82, 192/69.83, 108, 69.82
See application file for complete search history.

(56) References Cited

U.S. PATENT DOCUMENTS

| | | | |
|---|---|---|---|
| 489,709 A | 1/1893 | Hering | |
| 1,163,085 A * | 12/1915 | Hardy | 192/108 |
| 4,545,470 A | 10/1985 | Grimm | |
| 4,566,566 A * | 1/1986 | Vuillet | 192/24 |
| 4,734,590 A * | 3/1988 | Fluegel | 290/1 C |
| 5,023,789 A | 6/1991 | Lampe et al. | |
| 5,029,689 A | 7/1991 | Grimm | |
| 5,103,949 A * | 4/1992 | Vanderzyden et al. | 192/24 |
| 5,174,109 A | 12/1992 | Lampe | |
| 5,335,764 A * | 8/1994 | Leitner et al. | 192/85.02 |
| 5,562,190 A | 10/1996 | McArthur | |
| 6,095,303 A * | 8/2000 | Gutmann et al. | 192/48.91 |
| 6,105,465 A * | 8/2000 | Tyson et al. | 74/650 |
| 6,533,506 B1 | 3/2003 | Hite | |
| 7,081,039 B2 | 7/2006 | Dilger et al. | |
| 7,131,275 B2 | 11/2006 | Gustafson | |
| 7,297,036 B1 * | 11/2007 | Weronke et al. | 440/75 |
| 7,441,612 B2 | 10/2008 | Durairajan et al. | |
| 7,508,086 B2 | 3/2009 | Huang | |
| 2006/0027434 A1* | 2/2006 | Capito | 192/69.83 |
| 2009/0184691 A1* | 7/2009 | Birdi et al. | 322/12 |
| 2009/0224727 A1* | 9/2009 | Burke et al. | 322/40 |

FOREIGN PATENT DOCUMENTS

CN 2924904 Y 7/2007

* cited by examiner

*Primary Examiner* — Quyen Leung
*Assistant Examiner* — Eric Johnson
(74) *Attorney, Agent, or Firm* — Carlson, Gaskey & Olds, PC

(57) ABSTRACT

A shaft for a clutch member comprises an engagement portion having a plurality of teeth spaced about a shaft centerline. The teeth have a tooth profile with a negative rake angle. The negative rake angle is between 1° and 2°. The teeth have a chamfer angle between the face of the negative rake and the face of the clutch end surface. The chamfer angle is between 65° and 75°. A rotor assembly for a generator, a generator and a method are also disclosed and claimed.

8 Claims, 2 Drawing Sheets

HIGH SPEED CLUTCH DESIGN WITH JAW TOOTH PROFILE TO REDUCE SEPARATING LOAD

BACKGROUND OF THE INVENTION

This application relates to a tooth profile for a clutch design wherein a separating force is reduced due to selected angles on the teeth.

Clutches are utilized in many applications to selectively transmit rotation from a drive shaft to a driven shaft. Clutches have teeth that engage each other, and which transmit torque during rotation. Typically, one of two clutch members is moved axially away from the other to disengage the clutch. This movement may occur while torque is still being transmitted between the teeth, and thus there is sometimes a challenge in separating the two.

In known art, the mating faces of the clutch teeth have a negative rake angle that has been relatively large, e.g. 5°, for example. This angle causes the clutch teeth to hook and lock the two halves of the clutch together while torque is being applied.

The clutch decoupling occurs while this torque is being transmitted. Thus, there is a significant amount of additional torque required to impart an angular twist onto one of the shafts to overcome the negative rake angle on the jaw teeth clutch. This additional torque (spike) is directly imparted to the gearbox that drives the generator, which necessitates that its gear train components be robustly designed to handle this additional torque loading. As the jaws are eventually separated through the negative rake portion of the tooth profile, a chamfered end of the tooth profile can also raise challenges since it is at a relatively small angle, 45° for example.

Potential energy may be stored in one of the two shaft members during wind-up, and may be released as a launching force that axially translates the movable jaw clutch member to a decoupled position. This force can impart an axial load to the input shaft and its support bearing.

Currently, such generators are often utilized in aircraft applications. In aircraft applications, these generators are exposed to very high speeds of rotation, and on the order of 16,000 rpm. Under such high speeds, there are significant challenges from the issues mentioned above.

SUMMARY OF THE INVENTION

In a disclosed embodiment, a shaft for a clutch member comprises an engagement portion having a plurality of teeth spaced about a shaft centerline. The teeth have a tooth profile such that sides of the teeth have a negative rake angle. The negative rake angle is between 1° and 2°. The teeth have a chamfer angle between the face of the negative rake and the face of the clutch end surface. The chamfer angle is between 65° and 75°.

A rotor assembly for a generator comprises a driven clutch member that may be moved to selectively engage and disengage the clutch member from an input shaft. There are teeth on both the driven clutch member and the input shaft to impart rotation from the input shaft to the driven clutch member. The driven shaft is associated to drive a main rotor assembly for a generator. The teeth on the driven clutch member and the input shaft are configured to have a tooth profile such that sides of the teeth have a negative rake angle. The negative rake angle is between 1° and 2°. The teeth have a chamfer angle between the face of the negative rake and the face of the clutch end surface. The chamfer angle is between 65° and 75°.

A generator includes a stator winding, rotor assembly, driven clutch member, and an input shaft. The input shaft is associated with a driven clutch member that may be moved to selectively engage and disengage itself from the input shaft. There are teeth on the driven clutch member and the input shaft. The input shaft imparts rotation to the driven clutch member. The driven clutch member is associated to drive a main rotor assembly for a generator. The teeth on the driven clutch member and input shaft are configured to have a tooth profile such that sides of the teeth have a negative rake angle. The negative rake angle is between 1° and 2°. The teeth have a chamfer angle between the face of the negative rake and the face of the clutch end surface. The chamfer angle is between 65° and 75°.

A method of forming a clutch member includes the steps of forming an engagement portion having a plurality of teeth spaced about a centerline. The teeth are formed to have a profile such that sides of the teeth have a negative rake angle of between 1° and 2°. The method also includes the step of forming a chamfer angle between the face of the negative rake and the face of the clutch end surface. The chamfer angle is formed to be between 65° and 75°.

These and other features of the present invention can be best understood from the following specification and drawings, the following of which is a brief description.

DETAILED DESCRIPTION OF THE PREFERRED EMBODIMENT

Figure 1:
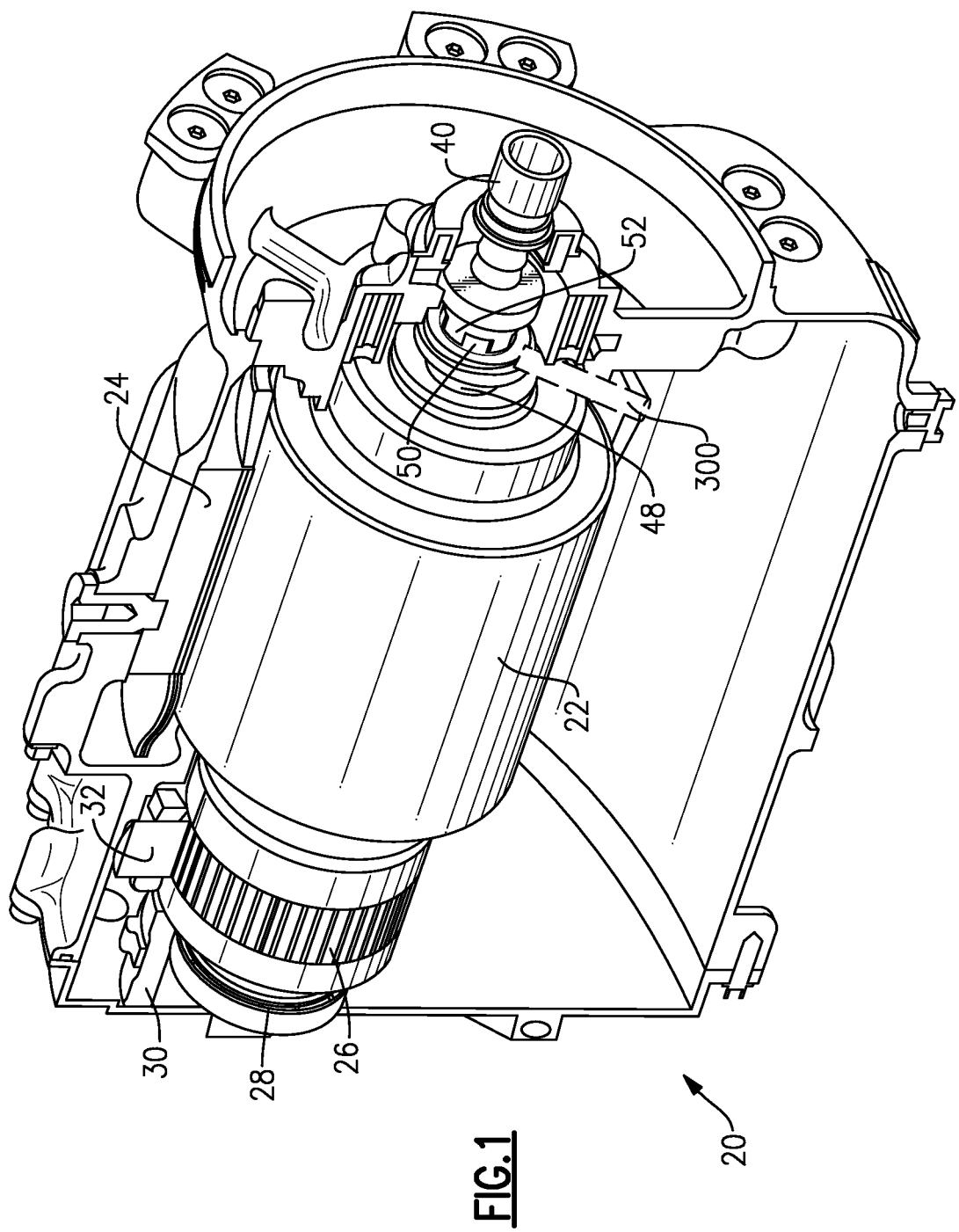
FIG. 1 shows a generator with a jaw clutch.

FIG. 1 shows a variable frequency generator 20 incorporating a main rotor assembly 22 that rotates adjacent to a main stator winding 24. As the rotor assembly 22 rotates, a voltage is generated in the stator winding 24, as known. This type generator is particularly well suited for aircraft applications. Recently, in aircraft applications, it has become necessary for a generator to be capable of operating with even higher speeds of operation than was the case in the past. As an example, speeds on the order of 24,000 rpm are not unusual.

An exciter rotor 26 and a permanent magnet rotor 28 rotate adjacent to stator members 32 and 30, as known. As shown in FIG. 1, the rotors 22, 26 and 28 are spaced along a shaft centerline.

A first clutch member 40 is a drive input shaft and carries clutch teeth 52 which selectively engage clutch teeth 50 on a second clutch member 48, on a movable driven clutch member. A yoke 300, shown in phantom, selectively moves the driven clutch member 48 to disengage or engage the clutch. The yoke has an angled face that selectively engages a ramp on the movable member 48 to cause the movable member to be cammed to the left as shown in this Figure, and disengage the clutch. Preferred embodiments of the interface between the yoke and the driven clutch member 48 are disclosed in co-pending patent application Ser. No. 12/436,159, entitled "Decoupler Shaft for High Speed Generator" filed on even date herewith, and owned by the assignee of this application.

Figure 2:
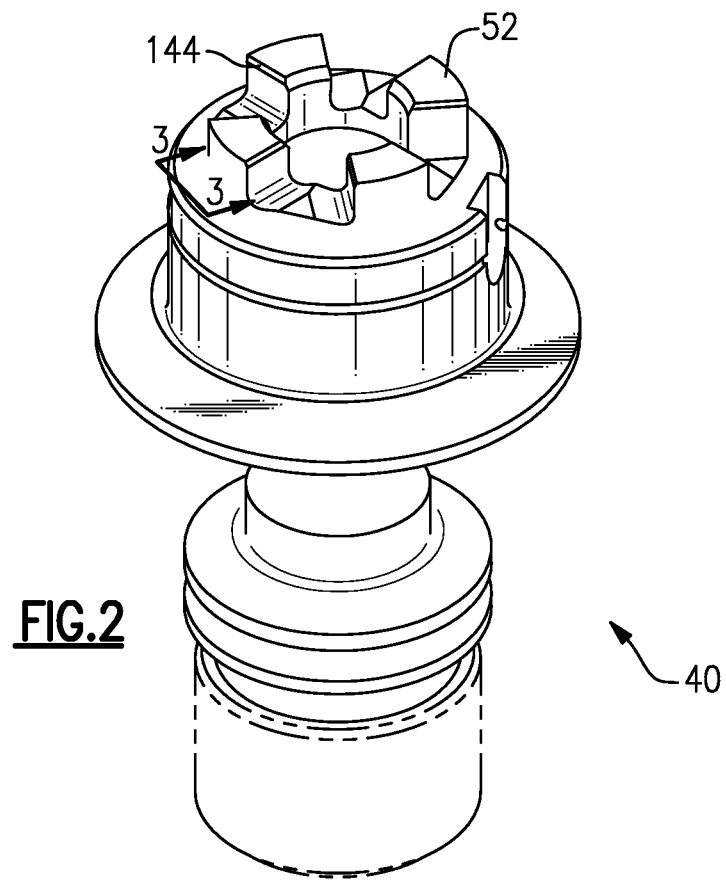
FIG. 2 is a perspective view of the jaw clutch member.

FIG. 2 shows details of input shaft 40.

Figure 3:
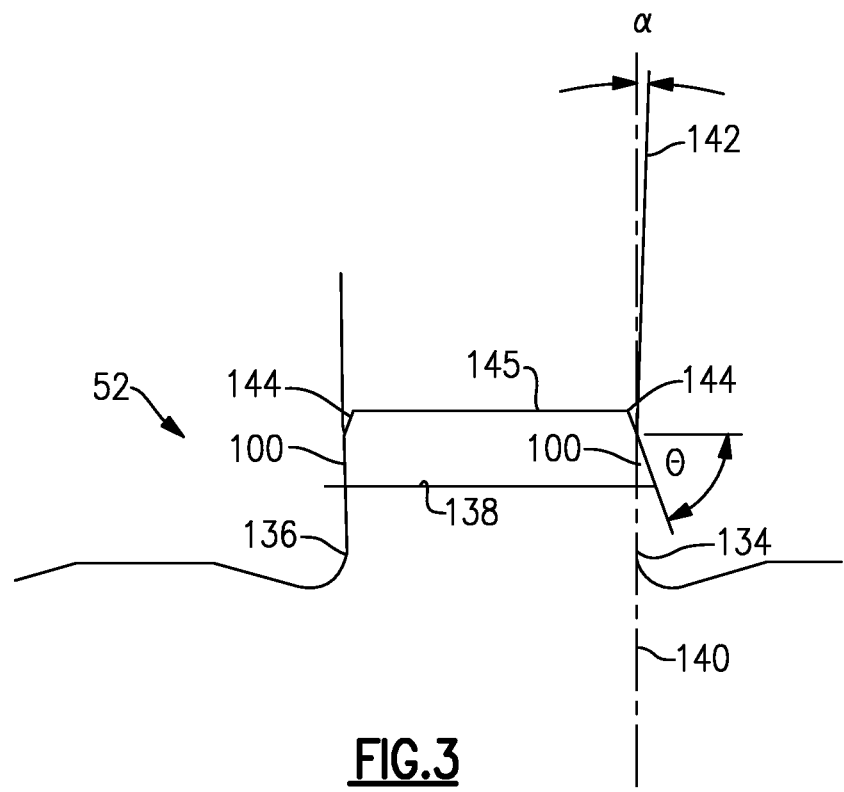
FIG. 3 shows a tooth angle for the inventive jaw clutch.

As shown in FIG. 3, a tooth profile for the teeth 52 includes a side face 100 at each side of the jaw tooth. In the illustration of FIG. 3, the right side is a drive face while the left side is an idle face. A shaft centerline 140 is illustrated as a reference point in this figure. The face 100 is preferably formed at a negative rake angle α of approximately 1.5°, or along the line shown at 142 relative to the line 140. The opposed idle face 100 is formed at the same angle in one embodiment.

A pitch datum 138 is shown, as are the circumferential ends 134 and 136 of the tooth 52. In addition, a chamfer 144 is formed between the face of the negative rake 100 and the face of the clutch end surface 145. The chamfer is at an angle θ as shown in FIG. 3, which may be on the order of 70°. Both chamfer angles are at the same angle.

In embodiments, the negative rake angle may be between 1° and 2°. The chamfer angle may be between 65° and 75°. The reduced rake angle reduces the amount of angular twist required on the driven clutch member to overcome the negative rake of the clutch teeth. As a result, potential energy stored within the driven clutch member is reduced, thus the launching force is reduced. Further, the increased chamfer angle on the tooth further reduces the axial load imparted to the input shaft and its support bearing. Additionally, the torque spike imparted to the gearbox that drives the generator is reduced, thus its gear train components can be designed to be smaller and lighter weight.

The tooth profile as shown in FIG. 3 is shown on input member 40, however, the driven clutch member 48 will have a corresponding tooth profile.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A clutch member comprising:
   an engagement portion having a plurality of teeth spaced about a centerline, said teeth having a tooth profile such that sides of said teeth have a negative rake angle, said negative rake angle being between 1° and 2°;
   said teeth having a chamfer angle between a face of the negative rake and a face of a clutch end surface, said chamfer angle being between 65° and 75°;
   said engagement portion being configured to transmit rotation as part of the operation of an electric generator; and
   said clutch member being an input member for use in an electric generator.

2. The clutch member as set forth in claim 1, wherein said negative rake angle is measured relative to the centerline.

3. A rotor assembly for a generator comprising:
   a driven clutch member that may be moved to selectively engage and disengage said driven clutch member from an input shaft, and there being teeth on said driven clutch member and said input shaft to impart rotation from said input shaft to said driven clutch member about a shaft centerline;
   said driven clutch member being associated to drive a main rotor assembly for a generator;
   said teeth on said driven clutch member and said input shaft being configured to have a tooth profile with a negative rake angle, and said negative rake angle being between 1° and 2°;
   said teeth having a chamfer angle between a face of the negative rake and a face of a clutch end surface, said chamfer angle being between 65° and 75°; and
   a generator rotor rotates with said driven clutch member, and the generator rotor including a main rotor, an exciter rotor, and a permanent magnet rotor spaced along the shaft centerline.

4. The rotor assembly as set forth in claim 3, wherein said negative rake angle is measured relative to the shaft centerline.

5. A generator comprising:
   a stator winding, rotor assembly, driven clutch member, and input shaft;
   said driven clutch member may be moved to selectively engage and disengage said driven clutch member from said input shaft, and there being teeth on said driven clutch member and said input shaft to impart rotation from said input shaft to said driven clutch member;
   said driven clutch member being associated to drive the rotor assembly about a shaft centerline, and rotation of the rotor assembly adjacent to the stator winding generating a voltage;
   said teeth on said driven clutch member and said input shaft being configured to have a tooth profile with a negative rake angle, and said negative rake angle being between 1° and 2°;
   said teeth having a chamfer angle between a face of the negative rake and a face of a clutch end surface, said chamfer angle being between 65° and 75°; and
   the rotor assembly comprises a main rotor, an exciter rotor, and a permanent magnet rotor spaced along the shaft centerline.

6. The generator as set forth in claim 5, wherein said negative rake angle is measured relative to the shaft centerline.

7. A method of forming a clutch member comprising the steps of:
   forming an engagement portion having a plurality of teeth spaced about a centerline, said teeth formed to have a profile such that sides of said teeth have a negative rake angle of between 1° and 2°; and
   forming a chamfer angle between a face of the negative rake and a face of a clutch end surface, said chamfer angle formed to be between 65° and 75°.

8. A method of assembling a generator comprising the steps of:
   assembling an input shaft and a driven clutch member into a generator, said driven clutch member being movable to selectively disengaged from said input shaft, and said driven clutch member being assembled to rotate with a rotor assembly in the generator, and wherein teeth on the input shaft and driven clutch member have a profile such that sides of said teeth have a negative rake angle of between 1° and 2° measured relative to said shaft centerline, a chamfer angle between a face of the negative rake angle and a face of a clutch end surface, with the chamfer angle being formed to be between 65° and 75°.

\* \* \* \* \*